Nov. 9, 1948.　　　J. B. WILFORD　　　2,453,291

SELF-ROTATING KING PIN THRUST BEARING

Filed Sept. 26, 1947

Inventor
John B. Wilford

By Clarence A. O'Brien
and Harvey B. Jackson
Attorneys

Patented Nov. 9, 1948

2,453,291

UNITED STATES PATENT OFFICE 2,453,291

SELF-ROTATING KINGPIN THRUST BEARING

John B. Wilford, Glasgow, Mont.

Application September 26, 1947, Serial No. 776,217

3 Claims. (Cl. 308—227)

1

The present invention relates to improvements in thrust bearing means which is expressly, but not necessarily, adapted for efficient use in conjunction with a king pin construction of the type currently used in steerable automobile or equivalent vehicle wheel constructions.

In the present day steering knuckle construction, the king pin is mounted in the yoke portion of the wheel spindle and extends through a knuckle on an axle. The thrust bearing means embodied in said knuckle construction utilizes a simple bearing arrangement comprising two complemental races and a single row of balls interposed between the coacting races. Since the front wheels of an automobile when in action are usually somewhat parallel to each other and straight ahead, the ball bearings are not subjected to any appreciable degree of rollable movements. As a matter of fact, the balls remain substantially in the same spot and eventually pound pockets in the annular raceways and distort the surfaces and tend to produce poor steering accomplishments.

With the above result constantly in effect, I believe that there is a long felt need for an improved bearing arrangement in which the balls may be periodically shifted and rolled in relation to the races, thereby preserving their spherical shapes and preventing the channel ways or grooves from becoming unduly pitted and thus undesirably distorted in shape. It follows that the purpose of the present invention is to provide thrust bearing means characterized primarily by three races and two sets or rows of balls mounted therebetween for constant adjustment purposes.

More specifically, novelty is predicated upon the triple race arrangement with the upper and lower rows of ball bearings, the intermediate or central race serving to accommodate the balls of both rows and there being ratchet means embodied for purposes of automatically attaining the desired ball adjustment results.

Other objects and advantages will become more readily apparent from the following description and the accompanying illustrative drawings.

In the drawings, wherein like numerals are employed to designate like parts throughout the views.

Figure 1:
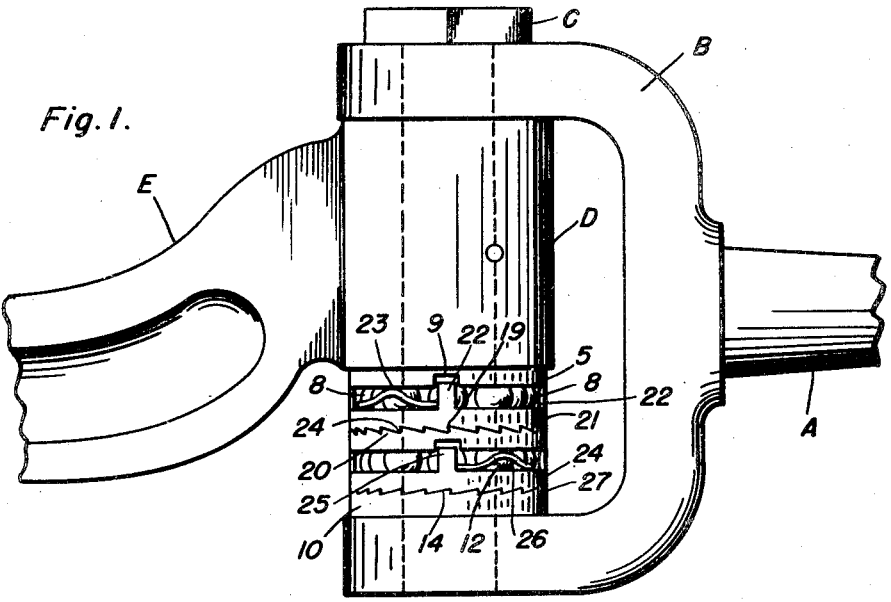
Figure 1 is a fragmentary elevational view showing a steering knuckle construction including thrust bearing means devised in accordance with the principles of the present invention.

Referring now to the drawings by distinguishing numerals the wheel spindle is denoted by the reference character A, the fork or yoke is indicated at B and the king pin is denoted at C. The king pin extends through the yoke arms and also through the customary knuckle D on the vehicle axle E.

The improved end thrust bearing means or assembly comprises as before indicated, an upper ball race 5 with a king pin opening 6 and with an endless groove 7 forming a raceway for the balls 8 of the upper row. At diametrically opposite points, the rim portion of said upper race is provided with assembling and keeper notches 9.

The lower ball race is denoted by the numeral 10, has an endless channel 11 forming a raceway for the balls 12 of the lower row, has a king pin hole 13 and is here shown with an annular upstanding rim serrated to form ratchet teeth 14.

Figure 2:
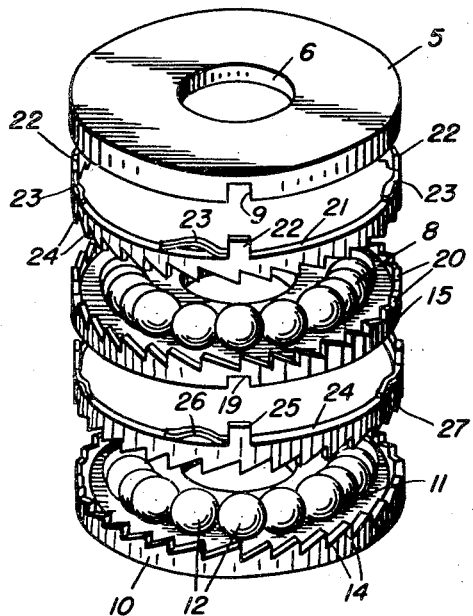
Figure 2 is an enlarged perspective view of the thrust bearing means with the parts thereof spread apart in group relationship to bring out the various details and relative arrangement of same.
Figure 3:
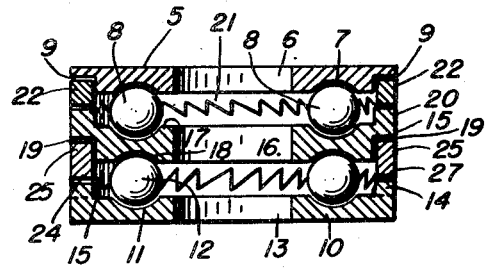
Figure 3 is an enlarged view based on Figure 2 but with all of the parts of Figure 2 brought together in assembled operating relationship.

The third or intermediate ball race is denoted by the numeral 15, has a king pin hole 16 registering with the other holes and has upper and lower channel ways 17 and 18 which co-act respectively with the runways 7 and 11 in accommodating co-acting half-portions of the balls 8 and 12 respectively. As seen in Figure 2, the lower portion of the marginal rim of said central ball race has diametrically opposite keeper and assembling notches 19. Also, the upstanding portion of the rim is serrated to provide additional ratchet teeth 20. The ratchet teeth 20 incline in a direction opposite to the first named ratchet teeth 14.

I next call attention to a combined ratcheting and locking ring 21 which has keeper lugs 22 fitting properly into the aforementioned keeper notches 9. Suitable springs 23 are provided and interposed between co-acting surfaces of the upper race 5 and upper edge of the ratchet ring 21. The ratchet teeth on this ring are denoted by the numeral 24 and are angled or pitched to co-act with the teeth 20.

There is a second correspondingly constructed ratchet ring and this is denoted by the numeral 24 and is situated between the intermediate and lower races. It has upstanding diametrically opposite keeper lugs 25 which project slidably into the keeper and assembling notches 19 on the central ball race. Springs 26 are interposed between said ring and ball race to separate the two and to facilitate spreading and distribution of lubricants such as may be placed between the respective parts of the entire assembly. The ratchet teeth on the ring 26 are denoted by the numerals 27 and are pitched to co-act with the first named ratchet teeth 16.

It is obvious that the weight of an automobile is carried on the thrust bearing means herein shown and described. In making a turn, the ratchet rings 21 and 24 will engage teeth on the center race and lower race in one direction only. The one-way rotation allows the balls to go completely around their raceways. For example, if the front wheel is turned to the right, the upper and center races are locked by the ratchet teeth, causing the balls between the center and lower races to turn to the right. In turning the front wheels to the left, the center and lower races are locked, allowing the upper row of balls to turn to the left. The advantage of this construction is the positive movement of the balls around the respective races which is calculated to prevent so-called Brinelling.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

In conclusion, I desire the expression "bearings" to comprehend the use of either balls, rollers, or the like.

Having thus described the invention, what is claimed as new is:

1. In a thrust assembly for use in connection with a steering knuckle and king pin construction of the class described, a ball race, a second ball race, a plurality of anti-friction ball bearings interposed between said races, one race having ratchet teeth, and a ring interposed between said races, said ring having ratchet teeth co-acting with the first named ratchet teeth, said first named ball race having notches, said ring having upstanding lugs projecting slidably into said notches, and spring means between the ring and ball race.

2. In a thrust bearing assembly for use in connection with a steering knuckle and king pin construction of the class described, a race, a second race, a plurality of anti-friction bearings interposed between said races, one race having ratchet teeth, and a ring interposed between said races, said ring having ratchet teeth coacting with the first-named ratchet teeth, a third ball race underlying the second ball race, said third ball race having marginal ratchet teeth, and a ring interposed between said second and third ball races, said ring having ratchet teeth coacting with the last-named ratchet teeth, and ratchet teeth last described being set in directions opposite to the ratchet teeth first described, and ball bearings interposed between said second and third-named races.

3. In a thrust bearing assembly for use in connection with a steering knuckle and king pin construction of the class described, a race, a second race, a plurality of anti-friction bearings interposed between said races, one race having ratchet teeth, and a ring interposed between said races, said ring having ratchet teeth coacting with the first-named ratchet teeth, a third ball race undelying the second ball race, said third ball race having marginal ratchet teeth, a ring interposed between said second and third ball races, said ring having ratchet teeth coacting with the last-named ratchet teeth, the ratchet teeth last described being set in directions opposite to the ratchet teeth first described, and ball bearings interposed between said second and third-named races, said second race having notches and said second ring having lugs projecting into said notches.

JOHN B. WILFORD.

REFERENCES CITED

The following references are of record in the file of this patent:

UNITED STATES PATENTS

| Number | Name | Date |
| --- | --- | --- |
| 2,030,953 | Gemeny | Feb. 18, 1936 |